United States Patent [19]

Murakami et al.

[11] 4,027,551

[45] June 7, 1977

[54] SPEED CHANGE GEAR SYSTEM

[75] Inventors: Noboru Murakami, Nagoya; Koichiro Hirosawa, Kariya; Kazuo Ohara; Koichi Matsuo, both of Toyota, all of Japan

[73] Assignee: Aisin Seiki Kabushiki Kaisha, Kariya, Japan

[22] Filed: May 27, 1975

[21] Appl. No.: 580,790

[30] Foreign Application Priority Data

June 27, 1974 Japan .................. 49-74137

[52] U.S. Cl. .................... 74/759; 74/753
[51] Int. Cl.² .......................... F16H 57/10
[58] Field of Search ............. 74/758, 759, 753

[56] References Cited

UNITED STATES PATENTS

| | | | |
|---|---|---|---|
| 2,786,369 | 3/1957 | Simpson | 74/759 |
| 3,067,632 | 12/1962 | Forster et al. | 74/759 |
| 3,398,606 | 8/1968 | Utter | 74/759 |
| 3,410,157 | 11/1968 | Livezey | 74/759 X |
| 3,483,771 | 12/1969 | Forster et al. | 74/759 |
| 3,736,815 | 6/1973 | Ito et al. | 74/759 |
| 3,863,524 | 2/1975 | Mori et al. | 74/759 X |

FOREIGN PATENTS OR APPLICATIONS 1,555,207   1/1971   Germany .................. 74/759

*Primary Examiner*—Samuel Scott
*Assistant Examiner*—Lance W. Chandler
*Attorney, Agent, or Firm*—Pierce, Scheffler & Parker

[57] ABSTRACT

A speed change gear system of the planetary gear type suited for applications within fluid couplings used upon automobiles includes three simple planetary gear sets of the single pinion type and the double pinion type, three clutch units, and at least two brake units. The movable members of the three planetary gear sets are suitably coupled to each other, and the brake units are suitably locked and unlocked so as to attain the desired speed ranges, that is, at least four forward drive speeds and at least one reverse drive speed.

10 Claims, 9 Drawing Figures

SPEED CHANGE GEAR SYSTEM

BACKGROUND OF THE INVENTION

1. Field of the Invention

The present invention relates generally to speed change gear systems and more particularly to a speed change gear system which is suited for applications with fluid couplings or torque converters employed within vehicles, especially automobiles.

2. Description of the Prior Art

It is desirable that the gear type speed change mechanism of automatic transmissions utilized upon large automobiles, such as for example, trucks and buses should be capable of shifting between at least four forward drive speeds and operating with at least one reverse drive speed. This speed changing mechanism may be realized by suitably combining three, four or even more simple sets of planetary gears of the single pinion or the double pinion type, a variety of combinations of which may be considered. Within any combination of such planetary gear sets, the following conditions are desired to be satisfied:

1. The output shaft of the transmission should be connected with the same element of the planetary gear sets within each speed range.
2. In order to reduce the peripheral speed of bearings of each element of the planetary gear set, the number of revolutions should be small as possible.
3. The load on teeth, that is, the tangential force, of each element should be small so as to maintain the strength of the gear teeth.
4. The gear set should meet the meshing conditions thereof for the number of teeth. The sun gear whose diameter is to be minimized, as well as each planetary pinion gear, should have the necessary number of teeth.
5. Within each planetary gear set, the coupling relationship among the elements should be simple and the distance from each other should be simple an the distance from each other should be small.
6. When attaining speed shifts by frictional coupling means during forward driving, such speed shifts should be available through one coupling means alone.

Conventional systems have failed to efficiently attain the aforementioned conditions.

SUMMARY OF THE INVENTION

Accordingly, it is an object of the present invention to provide an efficient speed change gear mechanism of the planetary gear type which is able to provide at least four forward drive speeds and one reverse drive speed.

The foregoing and other objects are achieved according to the present invention through the provision of a speed change gear mechanism employing three simple planetary gear sets of the single pinion type or double pinion type, three clutch units, and at least two brake units. The movable members of the three planetary gear sets are suitably coupled to each other, and the brake units are suitably locked and unlocked so as to attain the desired speed ranges.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts throughout the several views, and wherein.

Detailed Description of The Preferred Embodiments

Figure 1:
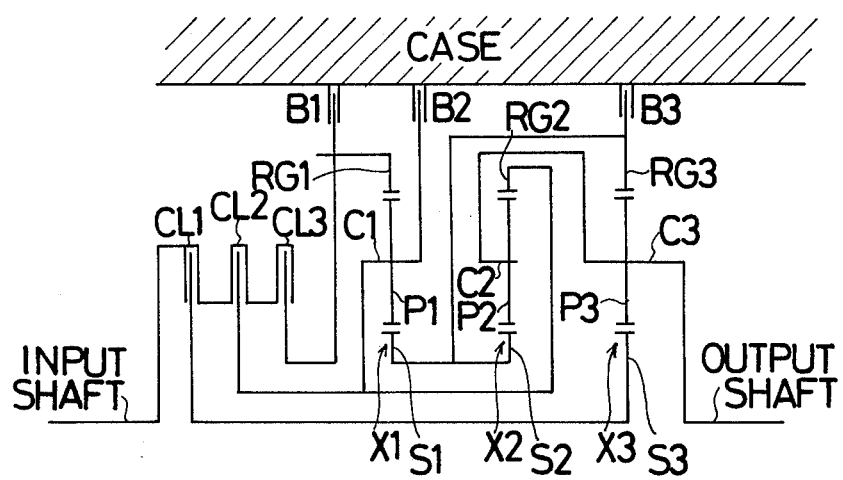
FIG. 1 is a schematic diagram of a first embodiment of a speed change gear system, constructed according to the present invention, and showing its cooperative parts.

Referring now to the drawings, and more particularly to FIG. 1 thereof, there is shown a gear mechanism which is applicable to the speed change gear system of the present invention.

The gear mechanism comprises a first planetary gear set X1 of the single pinion type, a second planetary gear set X2 of the double pinion type, and a third planetary gear set X3 of the single pinion type, interposed between an input shaft and an output shaft. The first planetary gear set X1 includes a first sun gear S1, a plurality of first pinion gears P1 engaged with the first sun gear S1, a first ring gear RG1 interengaged with the first pinion gears P1, and a first carrier C1 rotatably supporting the first pinion gears P1. The second planetary gear set X2 includes a second sun gear S2, a plurality of second pinion gears P2 engaged with the second sun gear S2, a second ring gear RG2 interengaged with the second pinion gears P2, and a second carrier C2 rotatably supporting the second pinion gears P2. The third planetary gear set X3 includes a third sun gear S3, a plurality of third pinion gears P3 engaged with the third sun gear S3, a third ring gear RG3 interengaged with the third pinion gears P3, and and a third carrier C3 rotatably supporting the third pinion gears P3. The first and second sun gears S1 and S2 and the third ring gear RG3 are drivingly connected with each other. The first carrier C1 and the second ring gear RG2 are drivingly connected with one another. Similarly, the second and third carriers C2 and C3 and the output shaft are drivingly connected with each other. Between the input shaft and the third sun gear S3 is interposed a first clutch CL1 which serves to couple or uncouple the input shaft with the third sun gear S3. Similarly, a second clutch CL2 is interposed between the input shaft and the first carrier C1 for coupling or uncoupling the input shaft with the first carrier C1 and the second ring gear RG2. A third clutch CL3 is interposed between the input shaft and the first ring gear RG1 for coupling or uncoupling the input shaft and the first ring gear RG1. A first brake B1 is secured to the case and is disposed between the case and the first ring gear RG1 so as to be capable of locking the latter to the case when the brake B1 is actuated. A second brake B2 is also secured to the case and is disposed between the case and the first carrier C1 and the second ring gear RG2 so as to be capable of locking the first carrier C1 and the second ring gear RG2 to the case when the brake B2 is actuated. Similarly, a third brake B3 is secured to the case and is disposed between the case and the first and second sun gears S1 and S2 and third ring gear RG3 so as to be capable of locking the first and second sun gears S1 and S2 and third ring gear RG3 to the case when the brake B3 is actuated.

The following equations are given for the planetary gear sets X1, X2 and X3 and the same hold true throughout all of the other embodiments as will be described hereinafter in greater detail:

$$NRG1 - (1 + I_1) NC1 + i I_1 NS1 = 0$$

$$NRG2 - (1 + I_2) NC2 + I_2 NS2 = 0$$

$$NRG3 - (1 + I_3) NC3 + I_3 NS3 = 0$$

$$NRG4 - (1 + I_4) NC4 + I_4 NS4 = 0$$

(this expression is applied to all of the other embodiment excluding the first embodiment)

wherein:
NRG1, NRG2, NRG3, NRG4 = the number of revolutions of the first, second, third and fourth ring gears;
NC1, NC2, NC3, NC4 = the number of revolutions of the first, second, third and fourth carriers;
NS1, NS2, NS3, NS4 = the number of revolutions of the first, second, third and fourth sun gears; and
$I_1, I_2, I_3, I_4$ = the radial ratios of each sun gear relative to each ring gear.

Within this embodiment of the present invention, the radial ratios within each speed range are assumed to have the specific values of $I_1$, $I_2$ and $I_3$ being 0.548, 0.452 and 0.375, respectively.

Table 1 shows the relationship between the reduction gear ratios and the various speed ranges of this embodiment as a result of the selective operation of clutches CL1, CL2, CL3 and brakes B1 through B3 wherein F$n$ ($n$ = 1, 2, 3) designates a forward drive speed range such as for example, F1 designates a first forward speed range, and R$n$ ($n$ = 1, 2) designates a reverse drive speed range. It is noted that a reduction gear ratio of 1 : 1.00 can be obtained by employing clutches CL1 and CL2 and CL3 and this is true within all embodiments of the present invention.

Table 1A shows the relationship between the number of revolutions and the tangential forces characteristic of the various elements of the planetary gear sets within each speed range. The ratio of the number of revolutions is based upon the assumption that the number of revolutions of the input shaft is 1, while the values of the tangential forces are based upon the assumption that the value of the input shaft torque exerted upon the ring gear is 1, and the tangential forces of the pinion gears are equal to those of the sun gears and ring gears. Within the Table 1A, A designates a particular speed range, B designates a particular element of the planetary gear sets, N designates the number of revolutions of the elements within the particular speed range, and W designates the tangential force of the particular element, such designations being the same throughout all of the embodiments of the invention.

As the reduction gear ratio of the fourth forward drive speed range F4 is 1 : 1.00, the number of revolutions N of each sun gear, ring gear and carrier is 1.00 and the number of revolutions N of each pinion gear is 0.00. The tangential forces W thereof are therefore considerably less then those produced within the other speed ranges, wherein the torque of the input shaft is transmitted to all of the gear set elements through only a single engaged clutch. To the contrary, however, the torque of the input shaft characteristic of the fourth forward drive speed F4 is transmitted and distributed to all of the gear set elements as a result of the engagement of at least two clutches, and accordingly, it is clear that the tangential forces generated and impressed upon such elements are smaller than those transmitted by means of the input shaft as a result of coupling only one clutch. Hereinafter, therefore, the number of revolutions N and the tangential forces W within the particular speed range having a reduction gear of 1 : 1.00 will be omitted.

Table 1

| | CL1 | CL2 | CL3 | B1 | B2 | B3 | GEAR RATIO |
|---|---|---|---|---|---|---|---|
| F1 | 0 | | | | | 0 | 3.67 |
| F2 | | | 0 | | | 0 | 2.25 |
| F3 | | 0 | | | | 0 | 1.45 |
| F4 | | 0 | 0 | | | | 1.00 |
| F5 | | 0 | | 0 | | | 0.64 |
| R1 | 0 | | | | 0 | | −4.90 |
| R2 | | | 0 | | 0 | | −1.76 |
| R3 | 0 | | | 0 | | | −1.14 |

Table 1A

| | | X1 | | | | X2 | | | | X3 | | |
|---|---|---|---|---|---|---|---|---|---|---|---|---|
| | | S1 | C1 | RG1 | P1 | S2 | C2 | RG2 | P2 | S3 | C3 | RG3 | P3 |
| F1 | N | 0.0 | 0.40 | 0.61 | 0.96 | 0.0 | 0.27 | 0.40 | 0.45 | 1.00 | 0.27 | 0.0 | −0.87 |
| | W | 0.00 | 0.00 | 0.00 | 0.00 | 0.00 | 0.00 | 0.00 | 0.00 | 2.67 | 5.33 | 2.67 | 2.67 |
| F2 | N | 0.0 | 0.65 | 1.00 | 1.57 | 0.0 | 0.44 | 0.65 | 0.73 | 1.63 | 0.44 | 0.0 | −1.42 |
| | W | 1.00 | 2.00 | 1.00 | 1.00 | 1.55 | 3.10 | 1.55 | 1.55 | 0.0 | 0.0 | 0.0 | 0.0 |
| F3 | N | 0.0 | 1.00 | 1.55 | 2.42 | 0.0 | 0.69 | 1.00 | 1.14 | 2.53 | 0.69 | 0.0 | −2.20 |
| | W | 0.00 | 0.00 | 0.00 | 0.00 | 1.00 | 2.00 | 1.00 | 1.00 | 0.0 | 0.0 | 0.0 | 0.0 |
| F5 | N | 2.82 | 1.00 | 0.0 | −4.42 | 2.82 | 1.57 | 1.00 | −2.07 | −1.78 | 1.57 | 2.82 | 4.02 |
| | W | 0.36 | 0.72 | 0.36 | 0.36 | 0.44 | 0.88 | 0.44 | 0.44 | 0.0 | 0.0 | 0.0 | 0.0 |
| R1 | N | −0.66 | 0.0 | 0.36 | 1.59 | −0.66 | −0.20 | −0.00 | 0.74 | 1.00 | −0.20 | −0.66 | −1.44 |
| | W | 0.00 | 0.00 | 0.00 | 0.00 | 5.90 | 11.80 | 5.90 | 5.90 | 2.67 | 5.33 | 2.67 | 2.67 |
| R2 | N | −1.82 | 0.0 | 1.00 | 4.42 | −1.82 | −0.57 | 0.0 | 2.07 | 2.78 | −0.57 | −1.82 | −4.02 |
| | W | 1.00 | 2.00 | 1.00 | 1.00 | 1.21 | 2.42 | 1.21 | 1.21 | 0.0 | 0.00 | 0.00 | 0.00 |
| R3 | N | −1.58 | −0.56 | 0.0 | 2.48 | −1.58 | −0.88 | −0.56 | 1.16 | 1.00 | −0.88 | −1.58 | −2.26 |
| | W | 2.14 | 4.27 | 2.14 | 2.14 | 3.31 | 6.62 | 3.31 | 3.31 | 2.67 | 5.33 | 2.67 | 2.67 |

Referring now to the next embodiment illustrated in FIG. 1 wherein a fourth planetary gear set generally indicated by the reference character X4 of the single pinion type is interposed between the third planetary gear set X3 and the output shaft with respect to the first embodiment of FIG. 1 and is seen to include a fourth sun gear S4, a plurality of fourth pinion gears P4 engaged with the fourth sun gear S4, a fourth ring gear RG4 engaged with the fourth pinion gears P4, and a fourth carrier C4 rotatably supporting the fourth pinion gears P4. The fourth sun gear S4 and the output shaft are drivingly connected with each other and the fourth ring gear RG4 and the third ring gear RG3 are drivingly connected with each other, and the fourth ring gear RG4 is locked to the case, as well as the second and third ring gears RG2 and RG3, when the third brake B3 is actuated. A fourth brake B4 is secured to the case and is disposed between the case and the fourth carrier C4 so as to be capable of locking the carrier C4 to the case when the brake B4 is actuated.

Within this embodiment, the radial ratio within each speed range is assumed to be $I_4= 0.562$, and Table 2 shows the relationship between the reduction gear ratios within each speed range as a result of the selective operation of the clutches CL1, and CL2 and CL3 and the brakes B1 through B4, while Table 2A shows the relationship between the number of revolutions and the tangential forces characteristic of the elements of the planetary gear sets within each speed range.

Table 2

| | CL1 | CL2 | CL3 | B1 | B2 | B3 | B4 | GEAR RATIO |
|---|---|---|---|---|---|---|---|---|
| F1 | 0 | | | | | | 0 | 5.17 |
| F2 | 0 | | | | | 0 | | 3.67 |
| F3 | | | 0 | | | | 0 | 2.95 |
| F4 | | | 0 | | | 0 | | 2.25 |
| F5 | | 0 | | | | | 0 | 1.71 |
| F6 | | 0 | | | | 0 | | 1.45 |

Table 2-continued

| | CL1 | CL2 | CL3 | B1 | B2 | B3 | B4 | GEAR RATIO |
|---|---|---|---|---|---|---|---|---|
| F7 | | 0 | 0 | | | | | 1.00 |
| F8 | | 0 | | | 0 | | | 0.64 |
| R1 | 0 | | | | 0 | | | −4.90 |
| R2 | | | 0 | | 0 | | | −1.76 |
| R3 | 0 | | | | | 0 | | −1.14 |

Table 2A

| A | B | X1 | | | | X2 | | | |
|---|---|---|---|---|---|---|---|---|---|
| | | S1 | C1 | RG1 | P1 | S2 | C2 | RG2 | P2 |
| F1 | N | −0.11 | 0.33 | 0.57 | 1.06 | −0.11 | 0.19 | 0.33 | 0.50 |
| | W | 0.00 | 0.00 | 0.00 | 0.00 | 0.00 | 0.00 | 0.00 | 0.00 |
| F2 | N | 0.0 | 0.40 | 0.61 | 0.96 | 0.0 | 0.27 | 0.40 | 0.45 |
| | W | 0.00 | 0.00 | 0.00 | 0.00 | 0.00 | 0.00 | 0.00 | 0.00 |
| F3 | N | −0.19 | 0.58 | 1.00 | 1.86 | −0.19 | 0.34 | 0.58 | 0.87 |
| | W | 1.00 | 2.00 | 1.00 | 1.00 | 1.55 | 3.10 | 1.55 | 1.55 |
| F4 | N | 0.0 | 0.65 | 1.00 | 1.57 | 0.0 | 0.44 | 0.65 | 0.73 |
| | W | 1.00 | 2.00 | 1.00 | 1.00 | 1.55 | 3.10 | 1.55 | 1.55 |
| F5 | N | −0.33 | 1.00 | 1.73 | 3.22 | −0.33 | 0.59 | 1.00 | 1.51 |
| | W | 0.00 | 0.00 | 0.00 | 0.00 | 1.00 | 2.00 | 1.00 | 1.00 |
| F6 | N | 0.0 | 1.00 | 1.55 | 2.42 | 0.0 | 0.69 | 1.00 | 1.14 |
| | W | 0.00 | 0.00 | 0.00 | 0.00 | 1.00 | 2.00 | 1.00 | 1.00 |
| F8 | N | 2.82 | 1.00 | 0.0 | −4.42 | 2.82 | 1.57 | 1.00 | −2.07 |
| | W | 0.36 | 0.72 | 0.36 | 0.36 | 0.88 | 0.44 | 0.88 | 0.44 |
| R1 | N | −0.66 | 0.0 | 0.36 | 1.59 | −0.66 | −0.20 | −0.00 | 0.74 |
| | W | 0.00 | 0.00 | 0.00 | 0.00 | 5.90 | 11.80 | 5.90 | 5.90 |
| R2 | N | −1.82 | 0.0 | 1.00 | 4.42 | −1.82 | −0.57 | 0.0 | 2.07 |
| | W | 1.00 | 2.00 | 1.00 | 1.00 | 1.21 | 2.42 | 1.21 | 1.21 |
| R3 | N | −1.58 | −0.56 | 0.0 | 2.48 | −1.58 | −0.88 | −0.56 | 1.16 |
| | W | 2.14 | 4.27 | 2.14 | 2.14 | 3.31 | 6.62 | 3.31 | 3.31 |

| A | B | X3 | | | | X4 | | | |
|---|---|---|---|---|---|---|---|---|---|
| | | S3 | C3 | RG3 | P3 | S4 | C4 | RG4 | P4 |
| F1 | N | 1.00 | 0.19 | −0.11 | −0.97 | 0.19 | 0.00 | −0.11 | −0.50 |
| | W | 2.67 | 5.33 | 2.67 | 2.67 | 2.67 | 5.33 | 2.67 | 2.67 |
| F2 | N | 1.00 | 0.27 | 0.0 | −0.87 | 0.27 | 0.10 | 0.0 | −0.45 |
| | W | 2.67 | 5.33 | 2.67 | 2.67 | 0.0 | 0.0 | 0.0 | 0.0 |
| F3 | N | 1.75 | 0.34 | −0.19 | −1.70 | 0.34 | 0.00 | −0.19 | −0.87 |
| | W | 0.0 | 0.00 | 0.00 | 0.00 | 1.25 | 2.50 | 1.25 | 1.25 |
| F4 | N | 1.63 | 0.44 | 0.0 | −1.42 | 0.44 | 0.16 | 0.0 | −0.73 |
| | W | 1.55 | 0.0 | 0.0 | 0.0 | 0.0 | 0.0 | 0.0 | 0.0 |
| F5 | N | 3.03 | 0.59 | −0.33 | −2.93 | 0.59 | 0.00 | −0.33 | −1.50 |
| | W | 0.0 | 0.00 | 0.00 | 0.00 | 0.45 | 0.90 | 0.45 | 0.45 |
| F6 | N | 2.53 | 0.69 | 0.0 | −2.20 | 0.69 | 0.25 | 0.0 | −1.13 |
| | W | 0.0 | 0.0 | 0.0 | 0.0 | 0.0 | 0.0 | 0.0 | 0.0 |
| F8 | N | −1.78 | 1.57 | 2.82 | 4.02 | 1.57 | 2.37 | 2.82 | 2.06 |
| | W | 0.0 | 0.0 | 0.0 | 0.0 | 0.0 | 0.0 | 0.0 | 0.0 |
| R1 | N | 1.00 | −0.20 | −0.66 | −1.44 | −0.20 | −0.49 | −0.66 | −0.74 |
| | W | 2.67 | 5.33 | 2.67 | 2.67 | 0.0 | 0.0 | 0.0 | 0.0 |
| R2 | N | 2.78 | −0.57 | −1.82 | −4.02 | −0.57 | −1.37 | −1.82 | −2.06 |
| | W | 0.0 | 0.00 | 0.00 | 0.00 | 0.0 | 0.0 | 0.0 | 0.0 |
| R3 | N | 1.00 | −0.88 | −1.58 | −2.26 | −0.88 | −1.33 | −1.58 | −1.16 |
| | W | 2.67 | 5.33 | 2.67 | 2.67 | 0.0 | 0.0 | 0.0 | 0.0 |

Figure 2:
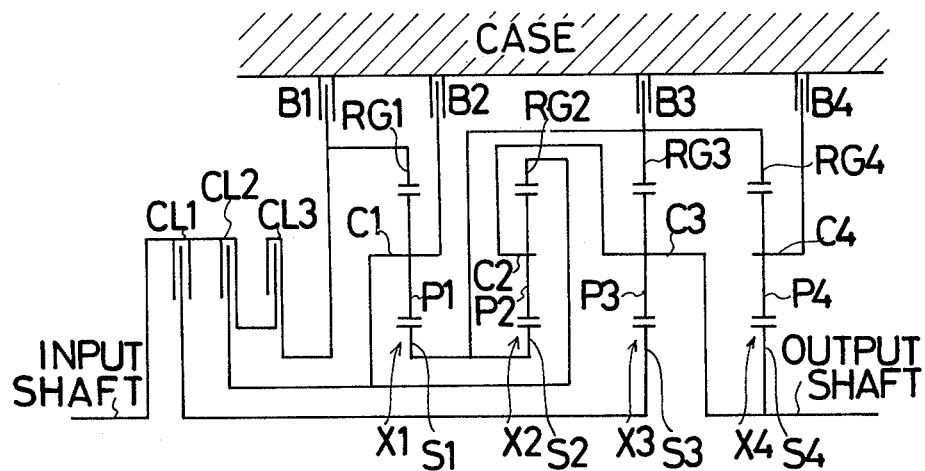
FIG. 2 is a diagram similar to that of FIG. 1 showing however a second embodiment of the present invention.
Figure 3:
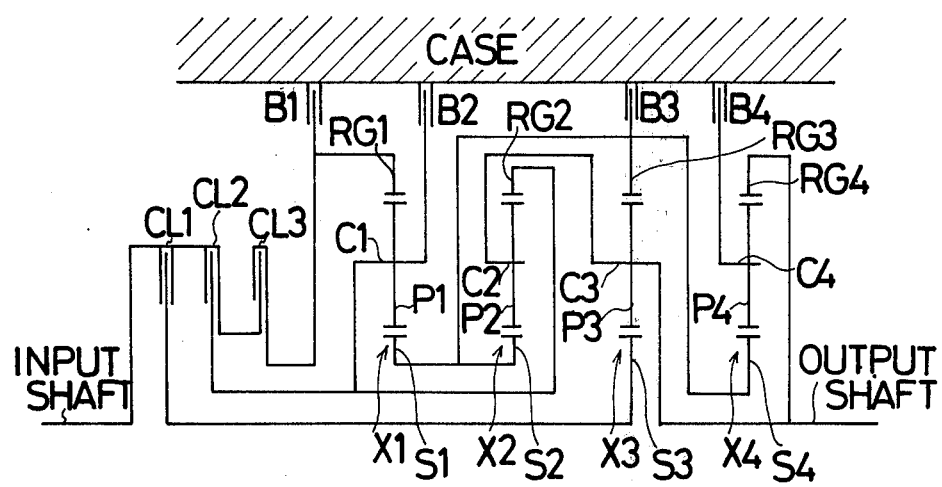
FIG. 3 is a diagram also similar to that of FIG. 1 showing a third embodiment of the present invention.

Referring now to FIG. 3, wherein the fourth planetary gear set X4 of the single pinion type is interposed between the third planetary gear set X3 and the output shaft as is similar to the previous embodiment of FIG. 2, however, the fourth planetary gear set X4 includes a fourth sun gear S4 drivingly connected with the third ring gear RG3, and is capable of being locked to the case together with the same when the third brake B3 is actuated. A fourth brake B4 is secured to the case and is disposed between the case and the fourth carrier C4 so as to be capable of locking the fourth carrier C4 relative thereto when brake B4 is actuated, and it is also noted that the fourth ring gear RG4 is drivingly connected with the output shaft.

Within this embodiment, the radial ratio within the speed changes is assumed to be $I_4=0.562$ and Table 3 shows the relationship between the reduction gear ratios within each speed range as a result of the operation of the clutches and brakes while Table 3A shows the relationship between the number of revolutions and the tangential forces characteristic of the elements of the planetary gear sets within each speed range.

fourth sun gear S4 relative thereto when the brake B4 is actuated, and it is also noted that the fourth ring gear RG4 is drivingly connected with the output shaft.

Within the embodiment, the radial ratio within each speed range is $I_4=0.562$, and Table 4 shows the relationship between the gear ratios and speed ranges as a result of the selective operation of the clutches and the brakes while Table 4A shows the relationship between the number of revolutions and the tangential forces characteristic of all the elements of the planetary gear sets within each speed range.

Table 3

| | CL1 | CL2 | CL3 | B1 | B2 | B3 | B4 | GEAR RATIO |
|---|---|---|---|---|---|---|---|---|
| F1 | 0 | | | | | | 0 | 8.41 |
| F2 | | | 0 | | | | 0 | 4.47 |
| F3 | 0 | | | | | 0 | | 3.67 |
| F4 | | | 0 | | | 0 | | 2.25 |
| F5 | | 0 | | | | 0 | | 1.45 |
| F6 | | 0 | | 0 | | | | 1.00 |
| F7 | | 0 | 0 | | | | | 0.64 |
| R1 | 0 | | | | 0 | | | −4.90 |
| R2 | | | 0 | | 0 | | | −1.76 |
| R3 | 0 | | | 0 | | | | −1.14 |

Table 3A

| B | | X1 | | | | X2 | | |
|---|---|---|---|---|---|---|---|---|
| A | | S1 | C1 | RG1 | P1 | S2 | C2 | RG2 | P2 |
| F1 | N | −0.21 | 0.27 | 0.53 | 1.16 | −0.21 | 0.12 | 0.27 | 0.55 |
| | W | 0.00 | 0.00 | 0.00 | 0.00 | 0.00 | 0.0 | 0.00 | 0.00 |
| F2 | N | −0.40 | 0.51 | 1.00 | 2.19 | −0.40 | 0.22 | 0.51 | 1.03 |
| | W | 1.00 | 2.00 | 1.00 | 1.00 | 1.55 | 3.10 | 1.55 | 1.55 |
| F3 | N | 0.0 | 0.40 | 0.61 | 0.96 | 0.0 | 0.27 | 0.40 | 0.45 |
| | W | 0.00 | 0.00 | 0.00 | 0.00 | 0.00 | 0.00 | 0.00 | 0.00 |
| F4 | N | 0.0 | 0.65 | 1.00 | 1.57 | 0.0 | 0.44 | 0.65 | 0.73 |
| | W | 1.00 | 2.00 | 1.00 | 1.00 | 1.55 | 3.10 | 1.55 | 1.55 |
| F5 | N | 0.0 | 1.00 | 1.55 | 2.42 | 0.0 | 0.69 | 1.00 | 1.14 |
| | W | 0.00 | 0.00 | 0.00 | 0.00 | 1.00 | 2.00 | 1.00 | 1.00 |
| F7 | N | 2.82 | 1.00 | 0.0 | −4.42 | 2.82 | 1.57 | 1.00 | −2.07 |
| | W | 0.36 | 0.72 | 0.36 | 0.36 | 0.44 | 0.88 | 0.44 | 0.44 |
| R1 | N | −0.66 | 0.0 | 0.36 | 1.59 | −0.66 | −0.20 | −0.00 | 0.74 |
| | W | 0.00 | 0.00 | 0.00 | 0.00 | 5.90 | 11.80 | 5.90 | 5.90 |
| R2 | N | −1.82 | 0.00 | 1.00 | 4.42 | −1.82 | −0.57 | 0.00 | 2.07 |
| | W | 1.00 | 2.00 | 1.00 | 1.00 | 1.21 | 2.42 | 1.21 | 1.21 |
| R3 | N | −1.58 | −0.56 | 0.0 | 2.48 | −1.58 | −0.88 | −0.56 | 1.16 |
| | W | 2.14 | 4.27 | 2.14 | 2.14 | 3.31 | 6.62 | 3.31 | 3.31 |

| B | | X3 | | | | X4 | | |
|---|---|---|---|---|---|---|---|---|
| A | | S3 | C3 | RG3 | P3 | S4 | C4 | RG4 | P4 |
| F1 | N | 1.00 | 0.12 | −0.21 | −1.06 | −0.21 | −0.00 | 0.12 | 0.54 |
| | W | 2.67 | 5.33 | 2.67 | 2.67 | 4.74 | 9.49 | 4.74 | 4.74 |
| F2 | N | 1.88 | 0.22 | −0.40 | −1.99 | −0.40 | −0.00 | 0.22 | 1.02 |
| | W | 0.0 | 0.0 | 0.0 | 0.0 | 2.22 | 4.44 | 2.22 | 2.22 |
| F3 | N | 1.00 | 0.27 | 0.0 | −0.87 | 0.0 | 0.17 | 0.27 | 0.45 |
| | W | 2.67 | 5.33 | 2.67 | 2.67 | 0.0 | 0.0 | 0.0 | 0.0 |
| F4 | N | 1.63 | 0.44 | 0.0 | −1.42 | 0.0 | 0.28 | 0.44 | 0.73 |
| | W | 0.0 | 0.0 | 0.0 | 0.0 | 0.0 | 0.0 | 0.0 | 0.0 |
| F5 | N | 2.53 | 0.69 | 0.0 | −2.20 | 0.0 | 0.44 | 0.69 | 1.13 |
| | W | 0.0 | 0.0 | 0.0 | 0.0 | 0.0 | 0.0 | 0.0 | 0.0 |
| F7 | N | −1.78 | 1.57 | 2.82 | 4.02 | 2.82 | 2.02 | 1.57 | −2.06 |
| | W | 0.0 | 0.0 | 0.0 | 0.0 | 0.0 | 0.0 | 0.0 | 0.0 |
| R1 | N | 1.00 | −0.20 | −0.66 | −1.44 | −0.66 | −0.37 | −0.20 | 0.74 |
| | W | 2.67 | 5.33 | 2.67 | 2.67 | 0.00 | 0.0 | 0.0 | 0.0 |
| R2 | N | 2.78 | −0.57 | −1.82 | −4.02 | −1.82 | −1.02 | −0.57 | 2.06 |
| | W | 0.0 | 0.0 | 0.0 | 0.0 | 0.0 | 0.0 | 0.0 | 0.0 |
| R3 | N | 1.00 | −0.88 | −1.58 | −2.26 | −1.58 | −1.13 | −0.88 | 1.16 |
| | W | 2.67 | 5.33 | 2.67 | 2.67 | 0.00 | 0.0 | 0.0 | 0.0 |

Figure 4:
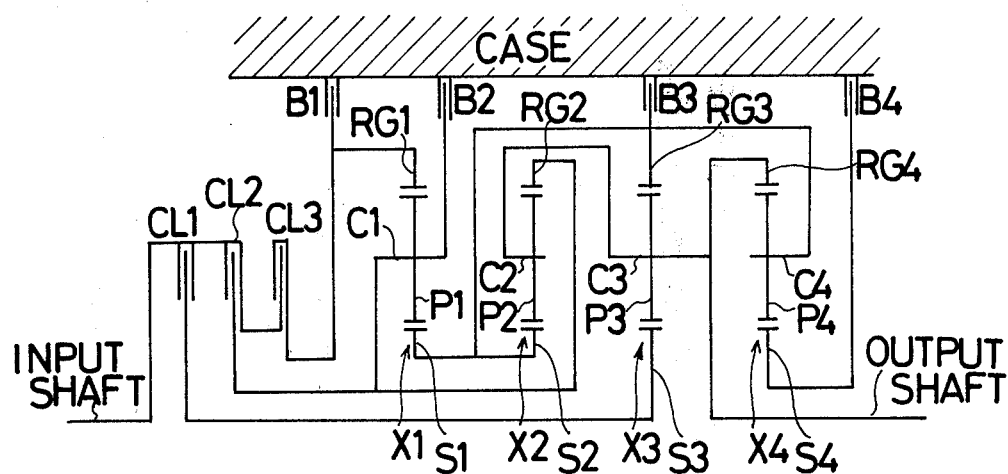
FIG. 4 is a diagram similar to FIG. 1 showing a fourth embodiment of the present invention.

With reference now being made to FIG. 4, the embodiment disposes the fourth planetary gear set X4 of the single pinion type between the third planetary gear set X3 and the output shaft in such a manner that the fourth carrier C4 is drivingly connected with the third ring gear RG3, the entire assembly thereby being capable of being locked relative to the case when the third brake B3 is actuated. The fourth brake B4 is secured to the case and is disposed between the case and the fourth sun gear S4 so as to be capable of locking the Table 4

| | CL1 | CL2 | CL3 | B1 | B2 | B3 | B4 | GEAR RATIO |
|---|---|---|---|---|---|---|---|---|
| F1 | 0 | | | | | | 0 | 3.67 |
| F2 | | | 0 | | | | 0 | 2.25 |
| F3 | 0 | | | | | 0 | | 1.96 |
| F4 | | | 0 | | | 0 | | 1.45 |
| F5 | | 0 | | | | 0 | | 1.44 |
| F6 | | 0 | | | | | 0 | 1.16 |
| F7 | | 0 | 0 | | | | | 1.00 |
| R1 | 0 | | | | 0 | | | −4.90 |
| R2 | | | 0 | | 0 | | | −1.76 |
| R3 | 0 | | | 0 | | | | −1.14 |

Table 4A

| B | | X1 | | | | X2 | | | | X3 | | | | X4 | | | |
|---|---|---|---|---|---|---|---|---|---|---|---|---|---|---|---|---|---|
| A | | S1 | C1 | RG1 | P1 | S2 | C2 | RG2 | P2 | S3 | C3 | RG3 | P3 | S4 | C4 | RG4 | P4 |
| F1 | N | 0.0 | 0.40 | 0.61 | 0.96 | 0.0 | 0.27 | 0.40 | 0.45 | 1.00 | 0.27 | 0.0 | −0.87 | −0.49 | 0.0 | 0.27 | 1.25 |
| | W | 0.00 | 0.00 | 0.00 | 0.00 | 0.00 | 0.00 | 0.00 | 0.00 | 2.67 | 5.33 | 2.67 | 2.67 | 0.00 | 0.00 | 0.00 | 0.00 |
| F2 | N | 0.0 | 0.65 | 1.00 | 1.57 | 0.0 | 0.44 | 0.65 | 0.73 | 1.63 | 0.44 | 0.0 | −1.42 | −0.79 | 0.0 | 0.44 | 2.03 |
| | W | 1.00 | 2.00 | 1.00 | 1.00 | 1.55 | 3.10 | 1.55 | 1.55 | 0.0 | 0.00 | 0.00 | 0.00 | 0.0 | 0.00 | 0.00 | 0.00 |
| F3 | N | 0.33 | 0.59 | 0.74 | 0.65 | 0.33 | 0.51 | 0.59 | 0.30 | 1.00 | 0.51 | 0.33 | −0.59 | 0.0 | 0.33 | 0.51 | 0.84 |
| | W | 0.00 | 0.00 | 0.00 | 0.00 | 0.00 | 0.00 | 0.00 | 0.00 | 2.67 | 5.33 | 2.67 | 2.67 | 1.71 | 3.41 | 1.71 | 1.71 |
| F4 | N | 0.0 | 1.00 | 1.55 | 2.42 | 0.0 | 0.69 | 1.00 | 1.14 | 2.53 | 0.69 | 0.0 | −2.20 | −1.23 | 0.0 | 0.69 | 3.14 |

Table 4A-continued

| A | B | X1 | | | | X2 | | | | X3 | | | | X4 | | | |
|---|---|---|---|---|---|---|---|---|---|---|---|---|---|---|---|---|---|
| | | S1 | C1 | RG1 | P1 | S2 | C2 | RG2 | P2 | S3 | C3 | RG3 | P3 | S4 | C4 | RG4 | P4 |
| | W | 0.00 | 0.00 | 0.00 | 0.00 | 1.00 | 2.00 | 1.00 | 1.00 | 0.0 | 0.00 | 0.00 | 0.00 | 0.0 | 0.00 | 0.00 | 0.00 |
| F5 | N | 0.44 | 0.80 | 1.00 | 0.87 | 0.44 | 0.69 | 0.80 | 0.41 | 1.35 | 0.69 | 0.44 | −0.79 | 0.0 | 0.44 | 0.69 | 1.13 |
| | W | 1.00 | 2.00 | 1.00 | 1.00 | 1.55 | 3.10 | 1.55 | 1.55 | 0.0 | 0.00 | 0.00 | 0.00 | 0.80 | 1.60 | 0.80 | 0.80 |
| F6 | N | 0.55 | 1.00 | 1.25 | 1.09 | 0.55 | 0.86 | 1.00 | 0.51 | 1.69 | 0.86 | 0.55 | −0.99 | 0.0 | 0.55 | 0.86 | 1.41 |
| | W | 0.00 | 0.00 | 0.00 | 0.00 | 1.00 | 2.00 | 1.00 | 1.00 | 0.0 | 0.00 | 0.00 | 0.00 | 0.29 | 0.58 | 0.29 | 0.29 |
| R1 | N | −0.66 | 0.0 | 0.36 | 1.59 | −0.66 | −0.20 | −0.00 | 0.74 | 1.00 | −0.20 | −0.66 | −1.44 | −1.46 | −0.66 | −0.20 | 2.06 |
| | W | 0.0 | 0.00 | 0.0 | 0.0 | 5.90 | 11.80 | 5.90 | 5.90 | 2.67 | 5.33 | 2.67 | 2.67 | 0.0 | 0.0 | 0.0 | 0.0 |
| R2 | N | −1.82 | 0.0 | 1.00 | 4.42 | −1.82 | −0.57 | 0.0 | 2.07 | 2.78 | −0.57 | −1.82 | −4.02 | −4.06 | −1.82 | −0.57 | 5.74 |
| | W | 1.00 | 2.00 | 1.00 | 1.00 | 1.21 | 2.42 | 1.21 | 1.21 | 0.0 | 0.00 | 0.00 | 0.00 | 0.0 | 0.00 | 0.00 | 0.00 |
| R3 | N | −1.58 | −0.56 | 0.0 | 2.48 | −1.58 | −0.88 | −0.56 | 1.16 | 1.00 | −0.88 | −1.58 | −2.26 | −2.84 | −1.58 | −0.88 | 3.22 |
| | W | 2.14 | 4.27 | 2.14 | 2.14 | 3.31 | 6.62 | 3.31 | 3.31 | 2.67 | 5.33 | 2.67 | 2.67 | 0.0 | 0.00 | 0.00 | 0.00 |

Figure 5:
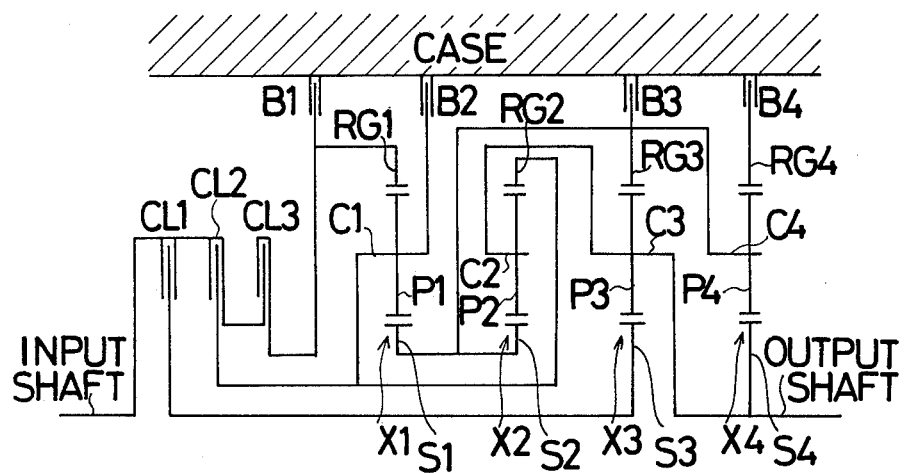
FIG. 5 is a diagram similar to FIG. 1 showing a fifth embodiment of the present invention.

A fifth embodiment of the system is illustrated within FIG. 5, and it is seen that the fourth planetary gear set X4 of the single pinion type is interposed between the third planetary gear set X3 and the output shaft wherein the fourth carrier C4 is drivingly connected with the third ring gears RG3, and the fourth carrier C4 is capable of being locked relative to the case when the third brake B3 is actuated. A fourth brake B4 is secured to the case and is disposed between the case and the fourth ring gear RG4 so as to be capable of locking the latter to the case when the brake B4 is actuated, and the fourth sun gear S4 is drivingly connected with the output shaft.

Within this embodiment, the radial ratio within the speed ranges is $I_4=0.562$, and Table 5 shows the relationship between the gear ratios and the speed ranges as a result of the selective operation of the clutches and brakes and Table 5A shows the relationship between the number of revolutions and the tangential forces characteristic of the elements within the planetary gear sets within each speed range.

Table 5

| | CL1 | CL2 | CL3 | B1 | B2 | B3 | B4 | GEAR RATIO |
|---|---|---|---|---|---|---|---|---|
| F1 | 0 | | | | | 0 | | 3.67 |
| F2 | 0 | | | | | | 0 | 2.71 |
| F3 | | | 0 | | | 0 | | 2.25 |
| F4 | | | 0 | | | | 0 | 1.80 |
| F5 | | 0 | | | | 0 | | 1.45 |
| F6 | | 0 | | | | | 0 | 1.29 |
| F7 | | 0 | 0 | | | | | 1.00 |
| F8 | | 0 | | 0 | | | | 0.64 |
| R1 | 0 | | | | 0 | | | −4.90 |
| R2 | | | 0 | | 0 | | | −1.76 |
| R3 | 0 | | | | 0 | | | −1.14 |

Table 5A

| A | B | X1 | | | | X2 | | | |
|---|---|---|---|---|---|---|---|---|---|
| | | S1 | C1 | RG1 | P1 | S2 | C2 | RG2 | P2 |
| F1 | N | 0.0 | 0.40 | 0.61 | 0.96 | 0.0 | 0.27 | 0.40 | 0.45 |
| | W | 0.00 | 0.00 | 0.00 | 0.00 | 0.00 | 0.00 | 0.00 | 0.00 |
| F2 | N | 0.13 | 0.48 | 0.66 | 0.83 | 0.13 | 0.37 | 0.48 | 0.39 |
| | W | 0.00 | 0.00 | 0.00 | 0.00 | 0.00 | 0.00 | 0.00 | 0.00 |
| F3 | N | 0.0 | 0.65 | 1.00 | 1.57 | 0.0 | 0.44 | 0.65 | 0.73 |
| | W | 1.00 | 2.00 | 1.00 | 1.00 | 1.55 | 3.10 | 1.55 | 1.55 |
| F4 | N | 0.20 | 0.72 | 1.00 | 1.25 | 0.20 | 0.56 | 0.72 | 0.59 |
| | W | 1.00 | 2.00 | 1.00 | 1.00 | 1.55 | 3.10 | 1.55 | 1.55 |
| F5 | N | 0.0 | 1.00 | 1.55 | 2.42 | 0.0 | 0.69 | 1.00 | 1.14 |
| | W | 0.0 | 0.0 | 0.0 | 0.0 | 1.00 | 2.00 | 1.00 | 1.00 |
| F6 | N | 0.28 | 1.00 | 1.40 | 1.75 | 0.28 | 0.78 | 1.00 | 0.82 |
| | W | 0.00 | 0.00 | 0.00 | 0.00 | 1.00 | 2.00 | 1.00 | 1.00 |
| F8 | N | 2.82 | 1.00 | 0.0 | −4.42 | 2.82 | 1.57 | 1.00 | −2.07 |
| | W | 0.36 | 0.72 | 0.36 | 0.36 | 0.44 | 0.88 | 0.44 | 0.44 |
| R1 | N | −0.66 | 0.0 | 0.36 | 1.59 | −0.66 | −0.20 | −0.00 | 0.74 |
| | W | 0.00 | 0.00 | 0.00 | 0.00 | 5.90 | 11.80 | 5.90 | 5.90 |
| R2 | N | −1.82 | 0.00 | 1.00 | 4.42 | −1.82 | −0.57 | 0.00 | 2.07 |
| | W | 1.00 | 2.00 | 1.00 | 1.00 | 1.21 | 2.42 | 1.21 | 1.21 |
| R3 | N | −1.58 | −0.56 | 0.0 | 2.48 | −1.58 | −0.88 | −0.56 | 1.06 |
| | W | 2.14 | 4.27 | 2.14 | 2.14 | 3.31 | 6.62 | 3.31 | 3.31 |

| A | B | X3 | | | | X4 | | | |
|---|---|---|---|---|---|---|---|---|---|
| | | S3 | C3 | RG3 | P3 | S4 | C4 | RG4 | P4 |
| F1 | N | 1.00 | 0.27 | 0.0 | −0.87 | 0.27 | 0.00 | −0.15 | −0.70 |
| | W | 2.67 | 5.33 | 2.67 | 2.67 | 0.0 | 0.0 | 0.0 | 0.0 |
| F2 | N | 1.00 | 0.37 | 0.13 | −0.76 | 0.37 | 0.13 | 0.0 | −0.61 |
| | W | 2.67 | 5.33 | 2.67 | 2.67 | 1.71 | 3.41 | 1.71 | 1.71 |
| F3 | N | 1.63 | 0.44 | 0.0 | −1.42 | 0.44 | 0.00 | −0.25 | −1.14 |
| | W | 0.0 | 0.00 | 0.00 | 0.00 | 0.0 | 0.0 | 0.0 | 0.0 |
| F4 | N | 1.51 | 0.56 | 0.20 | −1.14 | 0.56 | 0.20 | 0.0 | −0.91 |
| | W | 0.0 | 0.00 | 0.00 | 0.00 | 0.80 | 1.60 | 0.80 | 0.80 |
| F5 | N | 2.53 | 0.69 | 0.0 | −2.20 | 0.69 | 0.00 | −0.39 | −1.77 |
| | W | 0.0 | 0.00 | 0.00 | 0.00 | 0.00 | 0.00 | 0.00 | 0.00 |
| F6 | N | 2.10 | 0.78 | 0.28 | −1.59 | 0.78 | 0.28 | 0.0 | −1.27 |
| | W | 0.0 | 0.00 | 0.00 | 0.00 | 0.29 | 0.58 | 0.29 | 0.29 |
| F8 | N | −1.78 | 1.57 | 2.82 | 4.02 | 1.57 | 2.82 | 3.53 | 3.23 |
| | W | 0.0 | 0.00 | 0.00 | 0.00 | 0.00 | 0.00 | 0.00 | 0.00 |
| R1 | N | 1.00 | −0.20 | −0.66 | −1.44 | −0.20 | −0.66 | −0.91 | −1.16 |
| | W | 2.67 | 5.33 | 2.67 | 2.67 | 0.00 | 0.00 | 0.00 | 0.00 |
| R2 | N | 2.78 | −0.57 | −1.82 | −4.02 | −0.57 | −1.82 | −2.53 | −3.23 |
| | W | 0.0 | 0.0 | 0.0 | 0.0 | 0.0 | 0.0 | 0.0 | 0.0 |
| R3 | N | 1.00 | −0.88 | −1.58 | −2.26 | −0.88 | −1.58 | −1.98 | −1.81 |
| | W | 2.67 | 5.33 | 2.67 | 2.67 | 0.00 | 0.00 | 0.00 | 0.00 |

Figure 6:
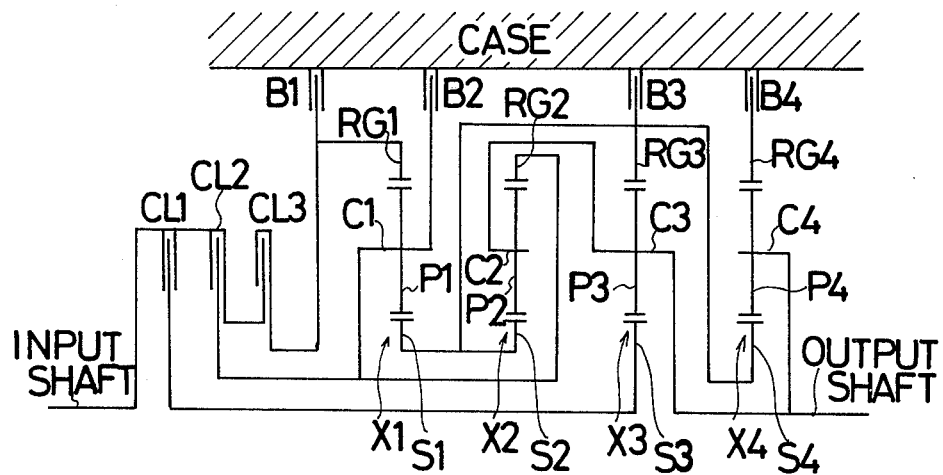
FIG. 6 is a diagram similar to FIG. 1 showing a sixth embodiment of the present invention.

Turning now to the consideration of a sixth embodiment of the present invention which is illustrated within FIG. 6, the fourth planetary gear set X4 of the single pinion type is disposed between the third planetary gear set X3 and the output shaft and it is seen that the fourth sun gear S4 is drivingly connected with the third ring gear RG3 and the same is capable of being locked relative to the case when the brake B3 is actuated. The fourth brake B4 is secured to the case and is disposed between the case and the fourth ring gear RG4 so as to be capable of locking the latter relative to the case when the brake B4 is actuated, it also being noted that the fourth carrier C4 is drivingly connected with the output shaft.

Within this embodiment, the radial ratio within each speed range is $I_4$=0.437 and Table 6 shows the relationship between the gear ratios and the speed ranges as a result of the selective operation of the clutches and brakes and Table 6A shows the relationship between the number of revolutions and the tangential forces characteristic of the elements of the planetary gear sets within each speed range.

Figure 7:
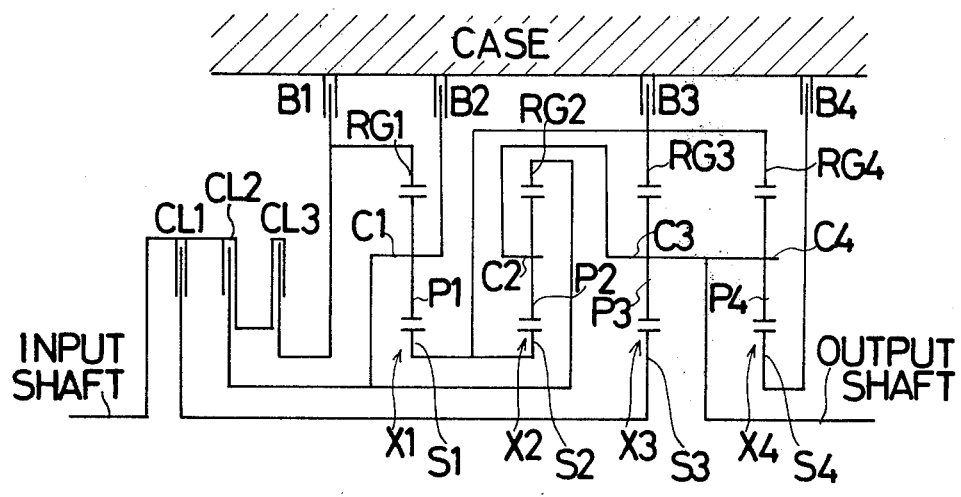
FIG. 7 is a diagram similar to FIG. 1 showing a seventh embodiment of the present invention.

Considering now a seventh embodiment of the present invention in connection with FIG. 7, the fourth planetary gear set X4 of the single pinion type is again interposed between the third planetary set X3 and the output shaft and is seen to include a fourth ring gear RG4 which is drivingly connected with the third ring gear RG3 and a fourth carrier C4 which is drivingly connected with the output shaft and the fourth ring gear RG4 is capable of being locked relative to the case when the brake B3 is actuated. A fourth brake B4 is disposed between the fourth sun gear S4 and the case for locking the former relative to the latter when the brake B4 is actuated.

Within this embodiment, the radial ratio within each speed range is $I_4$=0.562 and Table 7 shows the relationship between the gear ratios and the speed ranges as a result of the selective operation of the clutches and brakes while Table 7A shows the relationship between the number of revolutions and the tangential forces characteristic of the elements of the planetary gear sets within each speed range.

Table 6

| | CL1 | Cl2 | CL3 | B1 | B2 | B3 | B4 | GEAR RATIO |
|---|---|---|---|---|---|---|---|---|
| F1 | 0 | | | | | 0 | | 3.67 |
| F2 | | 0 | | | | 0 | | 2.25 |
| F3 | | 0 | | | | 0 | | 1.45 |
| F4 | | 0 | 0 | | | | | 1.00 |
| F5 | | 0 | | 0 | | | | 0.64 |
| R1 | 0 | | | | | | 0 | −5.10 |
| R2 | 0 | | | | 0 | | | −4.90 |
| R3 | | | 0 | | | | 0 | −1.86 |
| R4 | | | 0 | | 0 | | | −1.76 |
| R5 | 0 | | | 0 | | | | −1.14 |

Table 7

| | CL1 | CL2 | CL3 | B1 | B2 | B3 | B4 | GEAR RATIO |
|---|---|---|---|---|---|---|---|---|
| F1 | 0 | | | | | 0 | | 3.67 |
| F2 | | 0 | | | | 0 | | 2.25 |
| F3 | | 0 | | | | 0 | | 1.45 |
| F4 | | 0 | 0 | | | | | 1.00 |
| F5 | | 0 | | | | | 0 | 0.75 |
| R1 | 0 | | | | 0 | | | −4.90 |
| R2 | | 0 | | | 0 | | | −1.76 |
| R3 | 0 | | | 0 | | | | −1.14 |
| R4 | 0 | | | | | | 0 | −0.50 |

Table 6A

| B | | X1 | | | | X2 | | |
|---|---|---|---|---|---|---|---|---|
| A | S1 | C1 | RG1 | P1 | S2 | C2 | RG2 | P2 |
| F1 N | 0.0 | 0.40 | 0.61 | 0.96 | 0.0 | 0.27 | 0.40 | 0.45 |
| W | 0.00 | 0.00 | 0.00 | 0.00 | 0.00 | 0.00 | 0.00 | 0.00 |
| F2 N | 0.0 | 0.65 | 1.00 | 1.57 | 0.0 | 0.44 | 0.65 | 0.73 |
| W | 1.00 | 2.00 | 1.00 | 1.00 | 1.55 | 3.10 | 1.55 | 1.55 |
| F3 N | 0.0 | 1.00 | 1.55 | 2.42 | 0.0 | 0.69 | 1.00 | 1.14 |
| W | 0.00 | 0.00 | 0.00 | 0.00 | 1.00 | 2.00 | 1.00 | 1.00 |
| F5 N | 2.82 | 1.00 | 0.0 | −4.42 | 2.82 | 1.57 | 1.00 | −2.07 |
| W | 0.36 | 0.72 | 0.36 | 0.36 | 0.44 | 0.88 | 0.44 | 0.44 |
| R1 N | −0.64 | 0.01 | 0.36 | 1.58 | −0.64 | −0.20 | 0.01 | 0.74 |
| W | 0.0 | 0.0 | 0.0 | 0.0 | 0.0 | 0.0 | 0.0 | 0.0 |
| R2 N | −0.66 | 0.0 | 0.36 | 1.59 | −0.66 | −0.20 | −0.00 | 0.74 |
| W | 0.00 | 0.00 | 0.00 | 0.00 | 5.90 | 11.80 | 5.90 | 5.90 |
| R3 N | −1.77 | 0.02 | 1.00 | 4.34 | −1.77 | −0.54 | 0.02 | 2.03 |
| W | 1.00 | 2.00 | 1.00 | 1.00 | 1.55 | 3.10 | 1.55 | 1.55 |
| R4 N | −1.82 | 0.0 | 1.00 | 4.42 | −1.82 | −0.57 | 0.0 | 2.07 |
| W | 1.00 | 2.00 | 1.00 | 1.00 | 1.21 | 2.42 | 1.21 | 1.21 |
| R5 N | −1.58 | −0.56 | 0.0 | 2.48 | −1.58 | −0.88 | −0.56 | 1.16 |
| W | 2.14 | 4.27 | 2.14 | 2.14 | 3.31 | 6.62 | 3.31 | 3.31 |

| B | | X3 | | | | X4 | | |
|---|---|---|---|---|---|---|---|---|
| A | S3 | C3 | RG3 | P3 | S4 | C4 | RG4 | P4 |
| F1 N | 1.00 | 0.27 | 0.0 | −0.87 | 0.0 | 0.27 | 0.39 | 0.42 |
| W | 2.67 | 5.33 | 2.67 | 2.67 | 0.0 | 0.0 | 0.0 | 0.0 |
| F2 N | 1.63 | 0.44 | 0.0 | −1.42 | 0.0 | 0.44 | 0.64 | 0.69 |
| W | 0.0 | 0.0 | 0.0 | 0.0 | 0.0 | 0.0 | 0.0 | 0.0 |
| F3 N | 2.53 | 0.69 | 0.0 | −2.20 | 0.0 | 0.69 | 0.99 | 1.07 |
| W | 0.0 | 0.0 | 0.0 | 0.0 | 0.0 | 0.0 | 0.0 | 0.0 |
| F5 N | −1.78 | 1.57 | 2.82 | 4.02 | 2.82 | 1.57 | 1.02 | −1.95 |
| W | 0.0 | 0.0 | 0.0 | 0.0 | 0.0 | 0.0 | 0.0 | 0.0 |
| R1 N | 1.00 | −0.20 | −0.64 | −1.44 | −0.64 | −0.20 | 0.00 | 0.70 |
| W | 2.67 | 5.33 | 2.67 | 2.67 | 6.10 | 12.20 | 6.10 | 6.10 |
| R2 N | 1.00 | −0.20 | −0.66 | −1.44 | −1.66 | −0.20 | −0.01 | 0.70 |
| W | 2.67 | 5.33 | 2.67 | 2.67 | 0.00 | 0.0 | 0.0 | 0.0 |
| R3 N | 2.75 | −0.54 | −1.77 | −3.95 | −1.77 | −0.54 | 0.0 | 1.91 |
| W | 0.0 | 0.00 | 0.00 | 0.00 | 2.86 | 5.71 | 2.86 | 2.86 |
| R4 N | 2.78 | −0.57 | −1.82 | −4.02 | −1.82 | −0.57 | −0.02 | 1.95 |
| W | 0.0 | 0.00 | 0.00 | 0.00 | 0.00 | 0.0 | 0.0 | 0.0 |
| R5 N | 1.00 | −0.88 | −1.58 | −2.26 | −1.58 | −0.88 | −0.57 | 1.09 |
| W | 2.67 | 5.33 | 2.67 | 2.67 | 0.00 | 0.0 | 0.0 | 0.0 |

Table 7A

| A | B | X1 | | | | X2 | | | |
|---|---|---|---|---|---|---|---|---|---|
| | | S1 | C1 | RG1 | P1 | S2 | C2 | RG2 | P2 |
| F1 | N | 0.0 | 0.40 | 0.61 | 0.96 | 0.0 | 0.27 | 0.40 | 0.45 |
| | W | 0.00 | 0.00 | 0.00 | 0.00 | 0.00 | 0.00 | 0.00 | 0.00 |
| F2 | N | 0.0 | 0.65 | 1.00 | 1.57 | 0.0 | 0.44 | 0.65 | 0.78 |
| | W | 1.00 | 2.00 | 1.00 | 1.00 | 1.55 | 3.10 | 1.55 | 1.55 |
| F3 | N | 0.0 | 1.00 | 1.55 | 2.42 | 0.0 | 0.69 | 1.00 | 1.14 |
| | W | 0.00 | 0.00 | 0.00 | 0.00 | 1.00 | 2.00 | 1.00 | 1.00 |
| F5 | N | 2.09 | 1.00 | 0.40 | −2.65 | 2.09 | 1.34 | 1.00 | −1.24 |
| | W | 0.00 | 0.00 | 0.00 | 0.00 | 1.00 | 2.00 | 1.00 | 1.00 |
| R1 | N | −0.66 | 0.0 | 0.36 | 1.59 | −0.66 | −0.20 | −0.00 | 0.74 |
| | W | 0.00 | 0.00 | 0.00 | 0.00 | 5.90 | 11.80 | 5.90 | 5.90 |
| R2 | N | −1.82 | 0.0 | 1.00 | 4.42 | −1.82 | −0.57 | 0.0 | 2.07 |
| | W | 1.00 | 2.00 | 1.00 | 1.00 | 1.21 | 2.42 | 1.21 | 1.24 |
| R3 | N | −1.58 | −0.56 | 0.0 | 2.48 | −1.58 | −0.88 | −0.56 | 1.16 |
| | W | 2.14 | 4.27 | 2.14 | 2.14 | 3.31 | 6.62 | 3.31 | 3.31 |
| R4 | N | −3.13 | −1.50 | −0.60 | 3.97 | −3.13 | −2.01 | −1.50 | 1.86 |
| | W | 0.00 | 0.00 | 0.00 | 0.00 | 0.00 | 0.00 | 0.00 | 0.00 |

| A | B | X3 | | | | X4 | | | |
|---|---|---|---|---|---|---|---|---|---|
| | | S3 | C3 | RG3 | P3 | S4 | C4 | RG4 | P4 |
| F1 | N | 1.00 | 0.27 | 0.0 | −0.87 | 0.76 | 0.27 | 0.0 | −1.25 |
| | W | 2.67 | 5.33 | 2.67 | 2.67 | 0.0 | 0.0 | 0.0 | 0.0 |
| F2 | N | 1.63 | 0.44 | 0.0 | −1.42 | 1.24 | 0.44 | 0.0 | −2.03 |
| | W | 0.0 | 0.0 | 0.0 | 0.0 | 0.0 | 0.0 | 0.0 | 0.0 |
| F3 | N | 2.53 | 0.69 | 0.0 | −2.20 | 1.91 | 0.69 | 0.0 | −3.14 |
| | W | 0.0 | 0.0 | 0.0 | 0.0 | 0.0 | 0.0 | 0.0 | 0.0 |
| F5 | N | −0.67 | 1.34 | 2.09 | 2.41 | 0.0 | 1.34 | 2.09 | 3.44 |
| | W | 0.0 | 0.00 | 0.00 | 0.00 | 0.45 | 0.90 | 0.45 | 0.45 |
| R1 | N | 1.00 | −0.20 | −0.66 | −1.44 | 0.60 | −0.20 | −0.66 | −2.06 |
| | W | 2.67 | 5.33 | 2.67 | 2.67 | 0.0 | 0.0 | 0.0 | 0.0 |
| R2 | N | 2.78 | −0.57 | −1.82 | −4.02 | 1.67 | −0.67 | −1.82 | −5.74 |
| | W | 0.0 | 0.00 | 0.00 | 0.00 | 0.0 | 0.0 | 0.0 | 0.0 |
| R3 | N | 1.00 | −0.88 | −1.58 | −2.26 | 0.37 | −0.88 | −1.58 | −3.22 |
| | W | 2.67 | 5.33 | 2.67 | 2.67 | 0.0 | 0.0 | 0.0 | 0.0 |
| R4 | N | 1.00 | −2.01 | −3.13 | −3.61 | 0.0 | −2.01 | −3.13 | −5.15 |
| | W | 2.67 | 5.33 | 2.67 | 2.67 | 2.67 | 5.33 | 2.67 | 2.67 |

Figure 8:
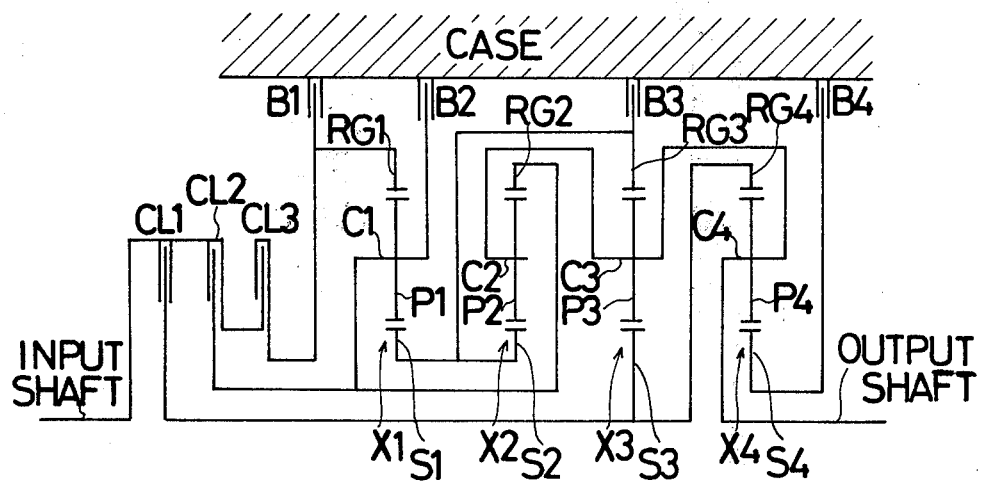
FIG. 8 is a diagram similar to FIG. 1 showing an eighth embodiment of the present invention.

An eighth embodiment of the present invention is illustrated within FIG. 8, wherein the fourth planetary gear set X4 of the single pinion type is seen to be disposed between the third planetary gear set X3 and the output shaft and includes a fourth ring gear RG4 which is drivingly connected with the third sun gear S3 and a fourth carrier C4 which is drivingly connected with output shaft. A fourth brake B4 is interposed between the fourth sun gear S4 and the case so as to be capable of locking the fourth sun gear S4 relative to the case when the brake B4 is actuated.

Within this embodiment, the radial ratio within each speed range is $I_4=0.280$ and Table 8 shows the relationship between the gear ratios and the speed ranges as a result of the selective operation of the clutches and the brakes while Table 8A shows the relationship between the number of revolutions and the tangential forces characteristic of all the elements of the planetary gear sets within each speed range.

Table 8

| | CL1 | CL2 | CL3 | B1 | B2 | B3 | B4 | GEAR RATIO |
|---|---|---|---|---|---|---|---|---|
| F1 | 0 | | | | 0 | | | 3.67 |
| F2 | | 0 | | | 0 | | | 2.25 |
| F3 | 0 | | | | | | 0 | 1.28 |
| F4 | | | 0 | | | | 0 | 1.13 |
| F5 | | 0 | | | | | 0 | 1.05 |
| F6 | 0 | 0 | | | | | | 1.00 |
| R1 | 0 | | | | 0 | | | −4.90 |

Table 8A

| A | B | X1 | | | | X2 | | | | X3 | | | | X4 | | | |
|---|---|---|---|---|---|---|---|---|---|---|---|---|---|---|---|---|---|
| | | S1 | C1 | RG1 | P1 | S2 | C2 | RG2 | P2 | S3 | C3 | RG3 | P3 | S4 | C4 | RG4 | P4 |
| F1 | N | 0.0 | 0.40 | 0.61 | 0.96 | 0.0 | 0.27 | 0.40 | 0.45 | 1.00 | 0.27 | 0.0 | −0.87 | −2.32 | 0.27 | 1.00 | 2.02 |
| | W | 0.00 | 0.00 | 0.00 | 0.00 | 0.00 | 0.0 | 0.00 | 0.00 | 2.67 | 5.33 | 2.67 | 2.67 | 0.0 | 0.00 | 0.00 | 0.00 |
| F2 | N | 0.0 | 0.65 | 1.00 | 1.57 | 0.0 | 0.44 | 0.65 | 0.73 | 1.63 | 0.44 | 0.0 | −1.42 | −3.79 | 0.44 | 1.63 | 3.30 |
| | W | 1.00 | 2.00 | 1.00 | 1.00 | 1.55 | 3.10 | 1.55 | 1.55 | 0.0 | 0.0 | 0.0 | 0.0 | 0.0 | 0.0 | 0.0 | 0.0 |
| F3 | N | 0.70 | 0.82 | 0.88 | 0.29 | 0.70 | 0.78 | 0.82 | 0.14 | 1.00 | 0.78 | 0.70 | −0.26 | 0.0 | 0.78 | 1.00 | 0.61 |
| | W | 0.00 | 0.00 | 0.00 | 0.00 | 0.00 | 0.00 | 0.00 | 0.00 | 0.00 | 0.00 | 0.00 | 0.00 | 1.00 | 2.00 | 1.00 | 1.00 |
| F4 | N | 0.79 | 0.93 | 1.00 | 0.33 | 0.79 | 0.88 | 0.93 | 0.15 | 1.13 | 0.88 | 0.79 | −0.30 | 0.0 | 0.88 | 1.13 | 0.69 |
| | W | 1.00 | 2.00 | 1.00 | 1.00 | 1.55 | 3.10 | 1.55 | 1.55 | 1.25 | 2.50 | 1.25 | 1.25 | 0.47 | 0.94 | 0.47 | 0.47 |
| F5 | N | 0.85 | 1.00 | 1.08 | 0.35 | 0.85 | 0.95 | 1.00 | 0.17 | 1.22 | 0.95 | 0.85 | −0.32 | 0.0 | 0.95 | 1.22 | 0.74 |
| | W | 0.00 | 0.00 | 0.00 | 0.00 | 1.00 | 2.00 | 1.00 | 1.00 | 0.45 | 0.90 | 0.45 | 0.45 | 0.17 | 0.34 | 0.17 | 0.17 |
| R1 | N | −0.66 | 0.0 | 0.36 | 1.59 | −0.66 | −0.20 | −0.00 | 0.74 | 1.00 | −0.20 | −0.66 | −1.44 | −4.50 | −0.20 | 1.00 | 3.34 |
| | W | 0.00 | 0.00 | 0.00 | 0.00 | 5.90 | 11.80 | 5.90 | 5.90 | 2.67 | 5.33 | 2.67 | 2.67 | 0.0 | 0.00 | 0.00 | 0.00 |

Figure 9:
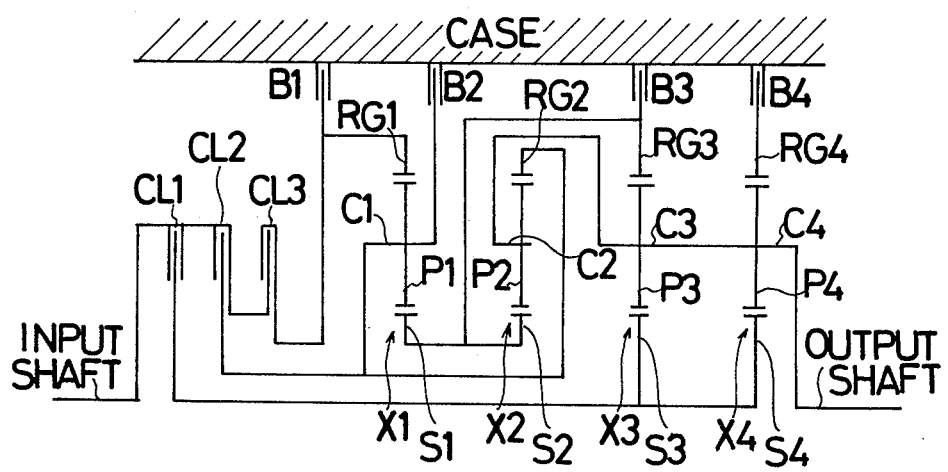
FIG. 9 is a diagram similar to FIG. 1 showing a ninth embodiment of the present invention.

A ninth embodiment of the present invention is illustrated within FIG. 9, wherein the fourth planetary gear set X4 of the single pinion type is interposed between the third planetary gear set X3 and the output shaft and is seen to include a fourth sun gear S4 drivingly connected with the third sun gear S3 and a fourth carrier drivingly connected with the output shaft. A fourth brake B4 is interposed between a fourth ring gear RG4 and the case so as to be capable of locking the fourth ring gear RG4 relative to the case when the brake B4 is actuated.

Within this embodiment, the radial ratio within each speed range is $I_4=0.280$ and Table 9 shows the relationship between the gear ratios and the speed ranges as a result of the selective operation of the clutches and brakes while Table 9A shows the relationship between the number of revolutions and the tangential forces characteristic of all the elements of the planetary gear sets within each speed range.

Table 9

| | CL1 | CL2 | CL3 | B1 | B2 | B3 | B4 | GEAR RATIO |
|---|---|---|---|---|---|---|---|---|
| F1 | 0 | | | | | | 0 | 4.57 |
| F2 | | 0 | | | | 0 | | 3.67 |
| F3 | | | 0 | | | | 0 | 2.67 |
| F4 | | | 0 | | | 0 | | 2.25 |
| F5 | | 0 | | | | | 0 | 1.61 |
| F6 | | 0 | | | | 0 | | 1.45 |
| F7 | | 0 | 0 | | | | | 1.00 |
| F8 | | 0 | | 0 | | | | 0.64 |
| R1 | 0 | | | | 0 | | | −4.90 |
| R2 | | | 0 | | 0 | | | −1.76 |
| R3 | 0 | | | 0 | | | | −1.14 |

Table 9A

| B | | X1 | | | | X2 | | |
|---|---|---|---|---|---|---|---|---|
| A | | S1 | C1 | RG1 | P1 | S2 | C2 | RG2 | P2 |
| F1 | N | −0.07 | 0.35 | 0.58 | 1.03 | −0.07 | 0.22 | 0.35 | 0.48 |
| | W | 0.00 | 0.00 | 0.00 | 0.00 | 0.00 | 0.00 | 0.00 | 0.00 |
| F2 | N | 0.0 | 0.40 | 0.61 | 0.96 | 0.0 | 0.27 | 0.40 | 0.45 |
| | W | 0.00 | 0.00 | 0.00 | 0.00 | 0.00 | 0.00 | 0.00 | 0.00 |
| F3 | N | 0.44 | 0.88 | 0.60 | 1.00 | 1.77 | −0.13 | 0.37 | 0.60 | 0.83 |
| | W | 1.00 | 2.00 | 1.00 | 1.00 | 1.55 | 3.10 | 1.55 | 1.55 |
| F4 | N | 0.0 | 0.65 | 1.00 | 1.57 | 0.0 | 0.44 | 0.65 | 0.73 |
| | W | 1.00 | 2.00 | 1.00 | 1.00 | 1.55 | 3.10 | 1.55 | 1.55 |
| F5 | N | −0.21 | 1.00 | 1.66 | 2.94 | −0.21 | 0.62 | 1.00 | 1.38 |
| | W | 0.00 | 0.00 | 0.00 | 0.00 | 1.00 | 2.00 | 1.00 | 1.00 |
| F6 | N | 0.0 | 1.00 | 1.55 | 2.42 | 0.0 | 0.69 | 1.00 | 1.14 |
| | W | 0.00 | 0.00 | 0.00 | 0.00 | 1.00 | 2.00 | 1.00 | 1.00 |
| F8 | N | 2.82 | 1.00 | 0.0 | −4.42 | 2.82 | 1.57 | 1.00 | −2.07 |
| | W | 0.36 | 0.72 | 0.36 | 0.36 | 0.4 | 0.88 | 0.44 | 0.44 |
| R1 | N | −0.66 | −0.00 | 0.36 | 1.59 | −0.66 | −0.20 | −0.00 | 0.74 |
| | W | 0.00 | 0.00 | 0.00 | 0.00 | 5.90 | 11.80 | 5.90 | 5.90 |
| R2 | N | −1.82 | 0.00 | 1.00 | 4.42 | −1.82 | −0.57 | 0.00 | 2.07 |
| | W | 1.00 | 2.00 | 1.00 | 1.00 | 1.21 | 2.42 | 1.21 | 1.21 |
| R3 | N | −1.58 | −0.56 | 0.0 | 2.48 | −1.58 | −0.88 | −0.56 | 1.16 |
| | W | 2.14 | 4.27 | 2.14 | 2.14 | 3.31 | 6.62 | 3.31 | 3.31 |

| B | | X3 | | | | X4 | | | |
|---|---|---|---|---|---|---|---|---|---|
| A | | S3 | C3 | RG3 | P3 | S4 | C4 | RG4 | P4 |
| F1 | N | 1.00 | 0.22 | −0.07 | −0.94 | 1.00 | 0.22 | 0.0 | −0.61 |
| | W | 0.0 | 0.00 | 0.00 | 0.00 | 3.57 | 7.14 | 3.57 | 3.57 |
| F2 | N | 1.00 | 0.27 | 0.0 | −0.87 | 1.00 | 0.27 | 0.07 | −0.57 |
| | W | 2.67 | 5.33 | 2.67 | ·2.67 | 0.00 | 0.0 | 0.0 | 0.0 |
| F3 | N | 1.71 | 0.37 | −0.13 | −1.60 | 1.71 | 0.37 | 0.0 | −1.04 |
| | W | 1.25 | 2.50 | 1.25 | 1.25 | 1.67 | 3.34 | 1.67 | 1.67 |
| F4 | N | 1.63 | 0.44 | 0.0 | −1.42 | 1.63 | 0.44 | 0.11 | −0.92 |
| | W | 0.00 | 0.0 | 0.0 | 0.0 | 0.00 | 0.0 | 0.0 | 0.0 |
| F5 | N | 2.85 | 0.62 | −0.21 | −2.67 | 2.85 | 0.62 | 0.0 | −1.73 |
| | W | 0.45 | 0.90 | 0.45 | 0.45 | 0.61 | 1.21 | 0.61 | 0.61 |
| F6 | N | 2.53 | 0.69 | 0.0 | −2.20 | 2.53 | 0.69 | 0.17 | −1.43 |
| | W | 0.00 | 0.0 | 0.0 | 0.0 | 0.00 | 0.0 | 0.0 | 0.0 |
| F8 | N | −1.78 | 1.57 | 2.82 | 4.02 | −1.78 | 1.57 | 2.51 | 2.61 |
| | W | 0.00 | 0.0 | 0.0 | 0.0 | 0.00 | 0.0 | 0.0 | 0.0 |
| R1 | N | 1.00 | −0.20 | −0.66 | −1.44 | 1.00 | −0.20 | −0.54 | −0.94 |
| | W | 2.67 | 5.33 | 2.67 | 2.67 | 0.0 | 0.0 | 0.0 | 0.0 |
| R2 | N | 2.78 | −0.57 | −1.82 | −4.02 | 2.78 | −0.57 | −1.51 | −2.61 |
| | W | 0.0 | 0.00 | 0.00 | 0.00 | 0.0 | 0.0 | 0.0 | 0.0 |
| R3 | N | 1.00 | −0.88 | −1.58 | −2.26 | 1.00 | −0.88 | −1.41 | −1.46 |
| | W | 2.67 | 5.33 | 2.67 | 2.67 | 0.00 | 0.0 | 0.0 | 0.0 |

Thus it may be seen that the present invention has important advantages over prior art speed change gear systems in that the speed change gear system of the present invention is capable of shifting between at least four forward drive speeds and one reverse drive speed, the same being readily and simply realized, the effect of which will no doubt contribute greatly to development of the motor vehicle industry.

Obviously, numerous modifications and variations of the present invention are possible in light of the above teachings. It is to be understood therefore that within the scope of the appended claims, the present invention may be practiced otherwise than as specifically described herein.

What is claimed as new and desired to be secured by Letters Patent of the United States Is:

1. A speed change gear system comprising:
   a casing;
   an input shaft;
   an output shaft;
   a first planetary gear set including a first sun gear, a first planetary gear engaged with said first sun gear, a first ring gear meshed with said first planetary gear, and a first carrier rotatably supporting said first planetary gear;
   a second planetary gear set including a second sun gear connected to said first sun gear, a second planetary gear meshed with said second sun gear, a second ring gear meshed with said second planetary gear and connected to said first carrier, and a second carrier rotatably supporting said second planetary gear;
   a third planetary gear set including a third sun gear; a third planetary gear meshed with said third sun gear, a third ring gear meshed with said third planetary gear and connected to said first and second sun gears, and a third carrier rotatably supporting said third planetary gear and connected to said second carrier and said output shaft;

a first clutch for engaging or disengaging said input shaft and said third sun gear;

a second clutch for engaging or disengaging said input shaft and said first carrier and said second ring gear;

a third clutch for engaging or disengaging said input shaft and said first ring gear;

a first brake for fixedly mounting said first carrier and said second ring gear on said casing; and a second brake for fixedly mounting said first and second sun gears and said third ring gear on said casing.

2. A speed change gear system as set forth in claim 1, and further comprising a third brake for fixedly mounting said first ring gear on said casing.

3. A speed change gear system as set forth in claim 1 and further comprising a fourth planetary gear set including a fourth sun gear drivingly connected with said output shaft, fourth planetary gear meshing with said fourth planetary gear and drivingly connected with said third ring gear, and a fourth carrier rotatably supporting said fourth planetary gear; and further brake for locking said fourth carrier to said casing.

4. A speed change gear system as set forth in claim 3 and further comprising a third brake for locking said first ring gear to said casing.

5. A speed change gear system as set forth in claim 1 and further comprising a fourth planetary gear set including a fourth sun gear drivingly connected with the third ring gear, fourth planetary gear meshing with said fourth sun gear, a fourth ring gear meshing with said fourth planetary gear and drivingly connected with said output shaft, and a fourth planetary carrier rotatably supporting said fourth planetary gear; and a further brake for locking said fourth carrier to said casing.

6. A speed change gear system as set forth in claim 5 and further comprising a third brake for locking said first ring gear to said casing.

7. A speed change gear system as set forth in claim 1 and further comprising a fourth planetary gear set including a fourth sun gear drivingly connected with the output shaft, a fourth planetary gear meshing with said fourth sun gear, a fourth ring gear meshing with said fourth planetary gear, a fourth planetary carrier rotatably supporting said fourth planetary gear and drivingly connected with said third ring gear; and a further brake for locking said fourth ring gear to said casing.

8. A speed change gear system as set forth in claim 7 wherein said brake means further comprises a third brake for locking said first ring gear to said casing.

9. A speed change gear system as set forth in claim 1 and further comprising a fourth planetary gear set including a fourth sun gear drivingly connected with said third sun gear, a fourth planetary gear meshing with said fourth sun gear, a fourth ring gear meshing with said fourth planetary gear, and a fourth carrier rotatably supporting said fourth planetary gear and drivingly connected with said output shaft; and a further brake for locking said fourth ring gear to said casing.

10. A speed change gear system as set forth in claim 9 and further comprising a third brake for locking said first ring gear to said casing.

* * * * *

UNITED STATES PATENT OFFICE
CERTIFICATE OF CORRECTION

PATENT NO. : 4,027,551
DATED : June 7, 1977
INVENTOR(S) : NOBORU MURAKAMI, et al It is certified that error appears in the above-identified patent and that said Letters Patent are hereby corrected as shown below:

In claim 3, line 5 after "fourth" insert:

- sun gear, a fourth ring gear meshing with said fourth -

Signed and Sealed this twenty-third Day of August 1977

[SEAL]

Attest:

RUTH C. MASON
Attesting Officer

C. MARSHALL DANN
Commissioner of Patents and Trademarks